United States Patent
Bahl et al.

(10) Patent No.: US 10,223,424 B2
(45) Date of Patent: Mar. 5, 2019

(54) MANAGEMENT OF INFORMATION FROM VERIFIED EXPERTS

(71) Applicant: International Business Machines Corporation, Armonk, NY (US)

(72) Inventors: Rohit Bahl, Ottawa (CA); Andrew R. Low, Stittsville (CA)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 15/077,315

(22) Filed: Mar. 22, 2016

(65) Prior Publication Data

US 2017/0277755 A1  Sep. 28, 2017

(51) Int. Cl.
*G06F 17/30* (2006.01)

(52) U.S. Cl.
CPC .... *G06F 17/30525* (2013.01); *G06F 17/3056* (2013.01); *G06F 17/30554* (2013.01); *G06F 17/30598* (2013.01)

(58) Field of Classification Search
CPC ........................... G06F 19/00; G06F 17/30867
USPC ........................................................ 707/738
See application file for complete search history.

(56) References Cited

U.S. PATENT DOCUMENTS

| | | | |
|---|---|---|---|
| 6,711,585 B1 * | 3/2004 | Coppernnan | G06F 17/30616 |
| 8,423,424 B2 | 4/2013 | Myslinski | |
| 8,712,789 B2 | 4/2014 | Stibel et al. | |
| 8,892,549 B1 * | 11/2014 | Thakur | G06F 17/30657 |
| | | | 707/728 |
| 2008/0114755 A1 * | 5/2008 | Wolters | G06F 17/30873 |
| 2014/0101085 A1 * | 4/2014 | Lu | G06N 5/02 |
| | | | 706/46 |
| 2014/0304343 A1 | 10/2014 | Skiba et al. | |

(Continued)

FOREIGN PATENT DOCUMENTS

WO  2013049461 A2  4/2013
WO  2014105345 A1  7/2014

OTHER PUBLICATIONS

Squicciarini et al., "Early Detection of Policy Violations in a Social Media Site: A Bayesian Belief Network Approach," Policies for Distributed Systems and Networks (POLICY), 2012 IEEE International Symposium, Jul. 16-18, 2012, pp. 45-52.

(Continued)

*Primary Examiner* — Hung T Vy
(74) *Attorney, Agent, or Firm* — Shumaker & Sieffert, P.A.

(57) ABSTRACT

Techniques are described for a system for providing expert information by verified experts in response to currently circulating assertions such as social media postings. In one example, a method includes identifying one or more authors of respective contents issued by one or more registered expert content sources as verified experts associated with tagged topics that are tagged in association with the respective contents. The method further includes detecting, in one or more media, a media content related to a topic of interest that corresponds to one or more of the tagged topics with which one or more of the verified experts are associated. The method further includes outputting the media content related to the topic of interest to a response interface made available to one or more of the verified experts associated with the one or more of the tagged topics that correspond to the topic of interest.

16 Claims, 5 Drawing Sheets

(56) References Cited

U.S. PATENT DOCUMENTS

| | | | |
|---|---|---|---|
| 2015/0088668 A1* | 3/2015 | Bruce | G06F 17/30893 |
| | | | 705/14.73 |
| 2016/0253710 A1* | 9/2016 | Publicover | H04W 4/21 |
| | | | 705/14.66 |
| 2016/0359790 A1* | 12/2016 | Zhang | H04L 51/32 |
| 2017/0076225 A1* | 3/2017 | Zhang | G06N 99/005 |

OTHER PUBLICATIONS

Barbier et al., "Provenance Data in Social Media," Synthesis Lectures on Data Mining and Knowledge Discovery 2013, Retrieved from <http://ieeexplore.ieee.org/xpl/articleDetails.jsp?tp=&arnumber=6812692&queryText%3Dreview+of+messages+on+social+media> 87 pgs.
Seth et al., "A personalized credibility model for recommending messages in social participatory media environments," World Wide Web, Jan. 2015, vol. 18, Issue 1, Published on Jul. 19, 2013, 30 pgs.
Kohring et al., "Trust in News Media: Development and Validation of a Multidimensional Scale," Communication Research, Apr. 2007, vol. 34 No. 2, pp. 231-252, Retrieved from <http://crx.sagepub.com/content/34/2/231.short>.
Metzger et al., "Social and Heuristic Approaches to Credibility Evaluation Online," Journal of Communication, vol. 60, Issue 3, Sep. 2010, Published on Aug. 18, 2010, Retrieved from <http://onlinelibrary.wiley.com/doi/10.1111/j.1460-2466.2010.01488.x/abstract?deniedAccessCustomisedMessage=&userIsAuthenticated=false> pp. 413-439.

* cited by examiner

MANAGEMENT OF INFORMATION FROM VERIFIED EXPERTS

TECHNICAL FIELD

This disclosure relates to social media.

BACKGROUND

Social media applications enable rapid and potentially vast publishing reach for contributors. Unlike traditional media such as news media or scientific or medical publications, social media applications enable potentially widespread dissemination of content typically without any verification or editorial filter.

SUMMARY

In one aspect of the invention, a method includes identifying one or more authors of respective contents issued by one or more registered expert content sources as verified experts associated with tagged topics that are tagged in association with the respective contents. The method further includes detecting, in one or more media, a media content related to a topic of interest that corresponds to one or more of the tagged topics with which one or more of the verified experts are associated. The method further includes outputting the media content related to the topic of interest to a response interface made available to one or more of the verified experts associated with the one or more of the tagged topics that correspond to the topic of interest.

In another aspect, a computer program product includes a computer-readable storage medium having program code embodied therewith. The program code is executable by a computing device to identify one or more authors of respective contents issued by one or more registered expert content sources as verified experts associated with tagged topics that are tagged in association with the respective contents. The program code is further executable by a computing device to detect, in one or more media, a media content related to a topic of interest that corresponds to one or more of the tagged topics with which one or more of the verified experts are associated. The program code is further executable by a computing device to output the media content related to the topic of interest to a response interface made available to one or more of the verified experts associated with the one or more of the tagged topics that correspond to the topic of interest.

In another aspect, a computer system includes one or more processors, one or more computer-readable memories, and one or more computer-readable storage mediums. The computer system further includes program instructions, stored on at least one of the one or more storage devices for execution by at least one of the one or more processors via at least one of the one or more memories, to identify one or more authors of respective contents issued by one or more registered expert content sources as verified experts associated with tagged topics that are tagged in association with the respective contents. The computer system further includes program instructions, stored on at least one of the one or more storage devices for execution by at least one of the one or more processors via at least one of the one or more memories, to detect, in one or more media, a media content related to a topic of interest that corresponds to one or more of the tagged topics with which one or more of the verified experts are associated. The computer system further includes program instructions, stored on at least one of the one or more storage devices for execution by at least one of the one or more processors via at least one of the one or more memories, to output the media content related to the topic of interest to a response interface made available to one or more of the verified experts associated with the one or more of the tagged topics that correspond to the topic of interest.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for techniques, methods, and systems generally directed to a verified expert information system that verifies experts on given topics and enables the verified experts to respond to topics of interest in popular information-sharing systems such as social media and news media. A system of this disclosure may verify experts in various particular subject matter areas by identifying and registering recognized sources of authority, such as prestigious scientific and medical journals and elite universities, and identifying authors of publications or other content issued by those recognized authorities as subject matter experts, for example. The system may then detect popular or "trending" contents or topics in media such as social media, and facilitate responses by the verified experts, as a trusted source of reliable answers or commentary. Examples of this disclosure may enable a flexible and distributed system for reliable, expert responses or commentary on currently popular topics or stories in social media, thus providing reliable, accurate information relevant to popular or trending topics online. Other features and advantages of the disclosure are apparent from the accompanying figures and the description below.

Figure 1:
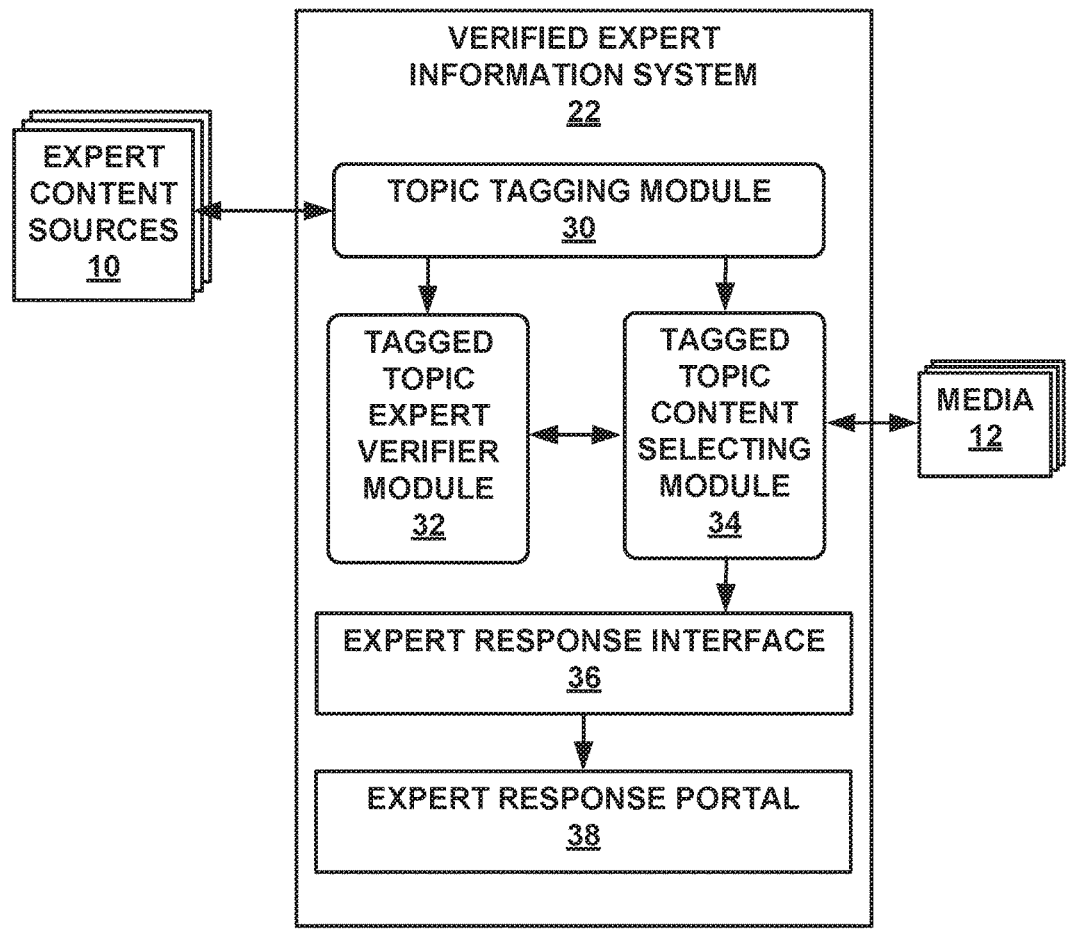
FIG. 1 depicts a conceptual block diagram of a verified expert information system, in one aspect of this disclosure.

FIG. 1 depicts a conceptual block diagram of a verified expert information system 22, in one aspect of this disclosure. Verified expert information system 22 may be a software system executed by one or more servers or other computing devices and accessible over network connections such as the Internet, for example. Verified expert information system 22 includes a topic tagging module 30, a tagged topic expert verifier module 32, a tagged topic content selecting module 34, an expert response interface 36, and an expert response portal 38, in the example of FIG. 1. These modules may each include a set of software program instruction code, for example. Verified expert information system 22 is also configured to interact with external resources including external expert content sources 10 and media 12, such as social media, online news media, blogs, or other types of media.

Topic tagging module 30 interacts with external expert content sources 10 to parse contents of the expert content sources 10 to identify topics of the contents. Topic tagging module 30 also identifies the authors of the contents from the expert content sources 10 as expert candidates in the respective topics. Tagged topic expert verifier module 32 receives outputs from topic tagging module 30, including the tagged topics of the contents and the identified authors of the contents, and verifies the authors as experts in the subject matter of the tagged topics of the contents they authored.

Tagged topic content selecting module 34 also receives outputs of topic tagging module 30, and compares topics of media contents from media 12 (e.g., popular or trending topics from social media) with the tagged topics of the expert contents. Tagged topic content selecting module 34 identifies tagged topics from the expert contents that correspond to the popular topics from media 12, and identifies verified experts associated with those tagged topics that correspond to the popular topics from media 12. Tagged topic content selecting module 34 then outputs the media contents to one or more of the verified experts identified as subject matter experts in one or more tagged topics that correspond to the topic of interest in the media contents. Tagged topic content selecting module 34 outputs those media contents to those relevant verified experts via expert response interface 36.

Expert response interface 36 may interact with a client application available to the verified experts, and may selectively output the media contents only to those particular verified experts identified as having subject matter expertise in the topic of interest of the media contents. Expert response interface 36 may provide notifications to the verified experts to indicate that the media contents are available for review and response. Expert response interface 36 may provide those notifications via email, text message, or device notification on a device on which an expert response interface client application is installed, for example. One or more of the verified experts in the subject matter of the media contents may then post new commentary, answers, or other content in response to the media contents, via expert response interface 36.

Expert response interface 36 may then post the verified expert responses to expert response portal 38, which may take the form of a web application, a social media feed, or other widely available output format, and which may refer back to or include samples of the original media contents. Expert response portal 38 may thus provide widely published or disseminated information from verified experts in the relevant subject matter on the topics of interest from the social media contents or other media contents.

Thus, in the example of FIG. 1, topic tagging module 30 and tagged topic expert verifier module 32 of verified expert information system 22 may identify one or more authors of respective contents issued by one or more registered expert content sources 10 as verified experts associated with tagged topics that are tagged in association with the authors' respective contents of the expert content sources 10. Verified expert information system 22 may further detect, in one or more media (e.g., social media, online news media), a media content related to a topic of interest that corresponds to one or more of the tagged topics with which one or more of the verified experts are associated. Verified expert information system 22 may further output the media content related to the topic of interest to an expert response interface 36 made available to one or more of the verified experts associated with the one or more of the tagged topics that correspond to the topic of interest. Verified expert information system 22 may then output responses from the verified experts via expert response portal 38. Additional details of an example verified expert information system are described below with reference to FIG. 2.

Figure 2:
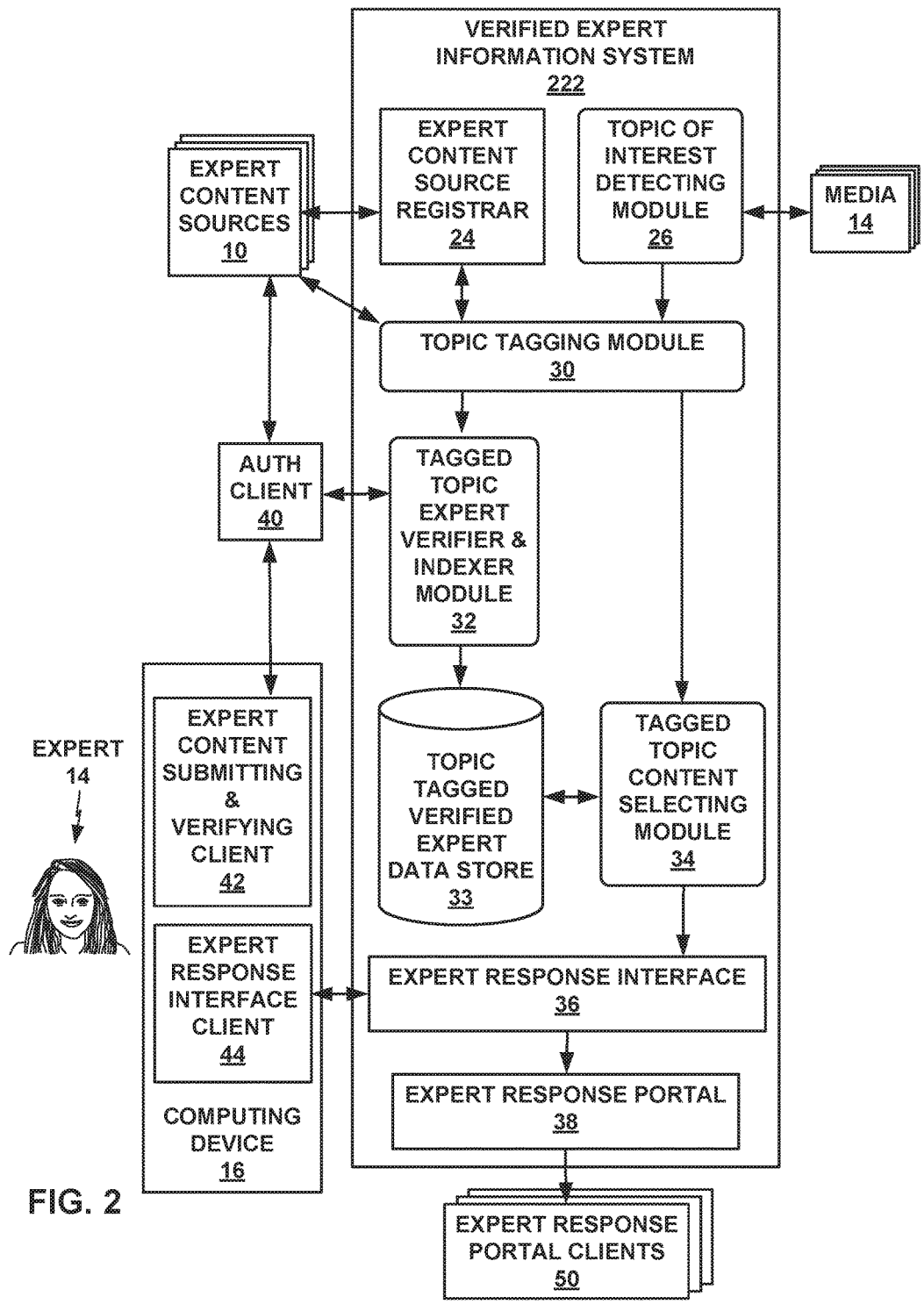
FIG. 2 depicts a conceptual block diagram of a verified expert information system, in another aspect of this disclosure.

FIG. 2 depicts a conceptual block diagram of a verified expert information system 222, in another aspect of this disclosure. Verified expert information system 222 is analogs to verified expert information system 22 of FIG. 1 with regard to some features, including topic tagging module 30, tagged topic expert verifier module 32, tagged topic content selecting module 34, expert response interface 36, and expert response portal 38. Verified expert information system 222 of the example of FIG. 2 further includes an expert content source registrar 24, a topic of interest detecting module 26, and a topic tagged verified expert data store 33. Tagged topic expert verifier module 32 may also interact with an authorization client 40. Tagged topic expert verifier module 32 may further interact with an expert content submitting and verifying client application 42 executed on an external computing device 16 belonging to or operated by an expert 14. Expert response interface 36 may interact with an expert response interface client application 44 that may also execute on the expert's computing device 16. Expert response portal 38 may also generate outputs to expert response portal clients 50, which may include browser applications, web applications, or other clients or interfaces for viewing or embedding verified expert responses provided by experts, such as expert 14, via expert response interface 36.

Topic of interest detecting module 26 may monitor popular external media such as social media, online news media, and other media. Topic of interest detecting module 26 may detect newly popular or increasingly popular topics of interest in new postings, articles, comments, or other contents issued via the media, either by parsing and detecting the topics of interest itself, or by detecting what the media indicate as trending topics. For example, topic of interest detecting module 26 may parse contents from one or more social media, and identify the topic of interest in the one or more social media based at least in part on detecting that the topic has increased in frequency in the parsed contents in the one or more social media. In other examples, topic of interest detecting module 26 may use other criteria to select topics of interest from external media, such as leading indicators of popularity, which may be by detecting interest from online users, outlets, or venues known to be early adopters of subsequently popular topics.

In some examples, topic of interest detecting module 26 may include or interface with a general user media authoring and posting tool, such that users can sign up with verified expert information system 222, submit posts to one or more social media, and have those posts scanned for topics of interest by verified expert information system 222. General users may use this service to facilitate getting authoritative expert responses to their own questions or statements posted to social media or other media (e.g., comments to an online news outlet or blog post). General social media users or aspiring online news media may also use this service to seek authoritative confirmation of the information they disseminate. Topic of interest detecting module 26 outputs topics of interest to topic tagging module 30.

Expert content source registrar 24 registers expert content sources 10. Expert content sources 10 may be selected or indicated by operators of verified expert information system 222, for being recognized sources of authority. These recognized sources of authority for registering as expert content sources 10 may include prestigious scientific and medical journals (e.g., the journal Science™, the journal Nature™, the New England Journal of Medicine™, the Journal of the American Medical Association™, Physical Review D™); well-regarded universities (e.g., Harvard University, Stanford University, Massachusetts Institute of Technology); or elite official institutions or societies (e.g., the Nobel Prize Committees, NASA, the National Research Council (NRC), the Institute of Electrical and Electronics Engineers (IEEE), the American Institute of Aeronautics and Astronautics (AIAA), the Federal Reserve), for example. The recognized sources of authority for registering as expert content sources 10 may include publications or institutions that adhere to selected standards for scholarly peer review or other standards for institutionalizing or promoting standards of academic or scholarly merit, or that are clearly recognized for upholding standards of scholarly expertise. The scholarly standards for qualifying a publication or institution for registering as an expert content source 10 may be governed and determined at least partly algorithmically, or may be determined in the judgment of users of expert content source registrar 24, in different examples.

In some examples, expert content source registrar 24 may also implement different grades or rankings of expertise or of verification of expertise depending on the number and quality of expert content sources 10. For example, expert content source registrar 24 may assign a standard verification of expertise to an author who is verified as having authored at least one article in a registered or recognized scientific or medical publication or who is verified as being at least an associate professor at a university. Expert content source registrar 24 may further assign a verification of one or more enhanced rankings of expertise to an author who is verified via multiple expert content sources 10 or with extraordinary credentials with expert content sources 10, such as an expert who is verified as having authored a very large number of peer-reviewed research publications in recognized scholarly journals, as holding a University Professorship or an endowed chair at a top university, as being a member of one of a National Academy, and/or as the recipient of one or more prestigious prizes or honors, such as a Nobel Prize.

Expert content source registrar 24 may register the expert content sources in association with respective topic tags, such that expert content source registrar 24 only registers a particular expert content source and its contents as a source of expertise in subject matters indicated by those respective topic tags. As particular examples, expert content source registrar 24 may register the Journal of the American Medical Association as an authoritative source of information in medicine and topics related to medicine, and register the IEEE as an authoritative source of information in electrical and electronic engineering and topics related to electrical and electronic engineering. Expert content source registrar 24 may associate the respective topic tags with the respective contents by the verified experts only for topic tags associated with the one or more expert content sources that have issued contents authored by the respective verified experts.

Registering the expert content sources 10 may include registering online sources (e.g., URLs) and/or online accounts (e.g., social media accounts) verified as being associated with or officially authorized by the expert content sources 10. Registering the expert content sources 10 may include automated registration of institutions that may be indicated as authoritative sources of expertise by algorithmic means, such as by confirming endorsement by or membership in existing recognized authoritative sources of expertise (e.g., algorithmic registration of a university as an authoritative source of expertise by its membership in an existing recognized authoritative source organization that includes several universities, such as the Association of Universities for Research in Astronomy (AURA)).

Topic tagging module 30 receives indications of registered external expert content sources 10 from expert content source registrar 24. Topic tagging module 30 may parse contents from the expert content sources 10 and identify and tag topics of the expert content sources, and associate the tagged topics with their authors as recognized experts in those respective topics. Topic tagging module 30 may also output the tagged topics and associated expert authors to tagged topic expert verifier and indexer module 32, which may confirm verification of outside users as the authors of the expert source contents, and thereby verify the external users as the identified experts. Tagged topic expert verifier and indexer module 32 may interact with external users through an authentication client 40.

Authentication client 40 may be either an external resource (e.g., OAuth, Oz), or included as part of verified expert information system 222. An external expert 14 using external computing device 16 may sign up or register with verified expert information system 222 by registering with tagged topic expert verifier and indexer module 32 by way of authentication client 40. Authentication client 40 may confirm the expert's login information or other credentials with expert content sources 10, and verify the expert's login information or other credentials with expert content sources 10 to tagged topic expert verifier and indexer module 32. Authentication client 40 may thus receive user login information from an expert candidate, and use a secure authorization technology to check the user login information with a particular expert content source from among the one or more expert content sources 10 to access verification of the expert candidate from the particular expert content source.

For example, expert 14 may be a professor at an elite university registered with verified expert information system 222 as one of expert content sources 10, or may regularly submit scholarly articles for publication to a prestigious peer-reviewed research journal that is registered with verified expert information system 222 as one of expert content sources 10. Expert 14 may have online account credentials with the university or the scholarly journal, such as an email address and password for logging into the university website or for submitting research paper manuscripts to the scholarly journal. Verified expert information system 222 may provide expert 14 with an interface for registering for verification with system 222, e.g., expert content submitting and verifying client 42 (e.g., a browser-accessed web application) that expert 14 may interface with on the expert's computing device 16. Authentication client 40 may verify those credentials as offered by an external user with the respective external registered expert content source, thereby verifying an external user's identity as the author identified by verified expert information system 222 as an expert in the subject matter of the tagged topics associated with the author's contents as published, posted, or otherwise issued by the respective one or more expert content sources 10. Tagged topic expert verifier and indexer module 32 may receive this verification of the expert 14, and may store the verified expert information, including information for contacting the expert (e.g., the expert's email address and/or social media account handles), in association with that expert's associated tagged topics of subject matter expertise, in tagged topic verified expert data store 33.

Verified expert information system 222 may also verify and register an expert's online handle or user name in one or more social media applications, for example. Verified expert information system 222 may detect if a verified online or social media account of an expert content source posts, re-publishes, links to, or otherwise issues a content by the expert, and may also use such online issuing of the expert's content as another form of verification of the expert's status or qualifications. Verified expert information system 222 may thus identify the one or more authors of respective contents issued by the one or more registered expert content sources 10 as verified experts associated with tagged topics that are tagged in association with the respective contents, where this may, in some examples, include registering an online identifier of an expert candidate as used online by one of the expert content sources 10.

Verified expert information system 222 may also provide expert content submitting and verifying client 42 and expert response interface client 44 (each e.g., a client mobile application, a web application front-end accessed via a web browser) to expert's computing device 16. Expert content submitting and verifying client 42 may also provide features for expert 14 to register new contents that expert 14 submits to expert content sources 10 with verified expert information system 222. That is, once expert 14 is registered with verified expert information system 222, expert 14 may select to have new expert contents submitted to verified expert information system 222 in tandem with submission of those contents to expert content sources 10, as a way of promoting or disseminating the expert's body of work and realm of expertise as recognized by verified expert information system 222.

Tagged topic content selecting module 34 selects tagged topics from topic tagging module 30 that correspond to topics of current interest in media 12 and that have been identified as topics of expert contents authored by verified experts. Tagged topic content selecting module 34 selects tagged topics for which to initiate expert responses, and accesses tagged topic verified expert data store 33 to retrieve contact information for one or more verified experts having subject matter expertise in the selected topics. Tagged topic content selecting module 34 outputs the expert contact information and corresponding media contents related to the selected one or more topics to expert response interface 36, which outputs a message or other indication to the respective experts (e.g., expert 14) at the experts' contact information (e.g., by sending an email, device notification, in-application notification) to respond to the media contents.

Expert 14 may receive the notification from expert response interface 36, and may view the media contents in expert response interface client 44 (e.g., a web application rendered in a browser, a dedicated mobile application) on the expert's computing device 16. Expert 14 may then also draft and submit a response to the media contents via expert response interface client 44. Expert 14 may also explicitly insert or associate one or more topic tags with the expert's response, to facilitate association by verified expert information system 222 of the expert's responses with topic tags selected by the expert, potentially including additional topic tags to associate with the media content and the expert's response beyond the one or more topic tags already selected for this association by verified expert information system 222. Expert response interface client 44 may communicate the expert's response to the media contents to expert response interface 36.

Expert response interface 36 may output responses from one or more verified experts, together with the corresponding media contents, or links to or indications of the corresponding media contents, potentially with representative samples of the corresponding media contents, to expert response portal 38, and/or via expert response portal 38 to external expert response portal clients 50. Verified expert information system 222 may associate or expose the topic tags selected by the expert together with the expert response via expert response portal 38 to external expert response portal clients 50, such that the expert response may be searchable or discoverable by the one or more topic tags selected by the expert or by verified expert information system 222. Expert response portal 38 may select representative samples of the corresponding media contents to reproduce at least in part based on portions that are selected or quoted by a responding expert, or by algorithmic means, such as by identifying the most popular or most read portion of the media content or by semantically identifying one or more summarizing portions of the media content. If the media content is below a certain length (e.g., a microblog post), expert response portal 38 may include the entire media content. Expert response portal 38 may also include a link to or an embedding of the media content.

Expert response portal 38 may organize multiple expert responses to a single media content. Expert response portal 38 may also make the media contents and expert responses searchable. Expert response portal 38 may also curate the media contents and expert responses, such as to select one or more topics of highest current interest to present foremost or first in expert response portal clients 50. Expert response portal clients 50 may be web application sites rendered in browsers on end user's devices, dedicated applications for end users' devices, embedded content in web application sites or applications on the end users' devices, or other interface that may facilitate viewership and information uptake by potentially large numbers of end users. Expert response portal 38 may also output or expose tagged topics with received verified expert answers as search terms available through other media, such as via embedding or trending topic indications in one or more social media, web applications, or mobile device applications, such that users who select or search for the tagged topic may be directed to an implementation of expert response portal clients 50.

Verified expert information system 222 may enable a topic search function in expert response portal 38 and/or expert response portal clients 50, wherein the topic search function enables output of the one or more responses from the one or more verified experts in response to a user query input corresponding to the media content or the topic of interest. Verified expert information system 222 may output one or more of the responses from the one or more verified experts on each of a plurality of topics of interest in an organized format in which the topics of interest are ranked based at least in part on at least one of: recency of popular interest, popularity of interest, geographical location, or individualized user data indicative of user interest of an external user of expert response portal 38 and/or expert response portal clients 50.

Expert response portal 38 may further associate verified expert badges or icons with the verified expert responses, where the badge is verifiable by an end user, such as by selecting the badge to be taken to a web application page that verifies the expert's identity or expertise, or to the expert's web pages at the website of the expert's university or other expert content source, for example. Expert response portal 38 may adhere the verifiable expert badge to the verified expert response, such that the badge adheres to the expert response in content embedded in other websites or applications, for example. Verified expert information system 222 may thus provide a verified expert badge that adheres to the responses from the verified experts in online postings, wherein the verified expert badge is selectably verifiable.

Verified expert information system 222 may thus enable verified expert responses to topics of current interest in social media or other information-sharing formats to be quickly generated and disseminated. Verified expert information system 222 may thus serve as a rapid source of reliable information relevant to currently popular topics of widespread interest, and a safe haven of reliable and accurate information in an otherwise often unreliable and unfiltered confusion of assertions in social media, poorly edited news media, and other online information sharing venues. Further details of an example implementation of a verified expert information system of this disclosure are depicted in FIG. 3 and described below with reference thereto.

Figure 3:
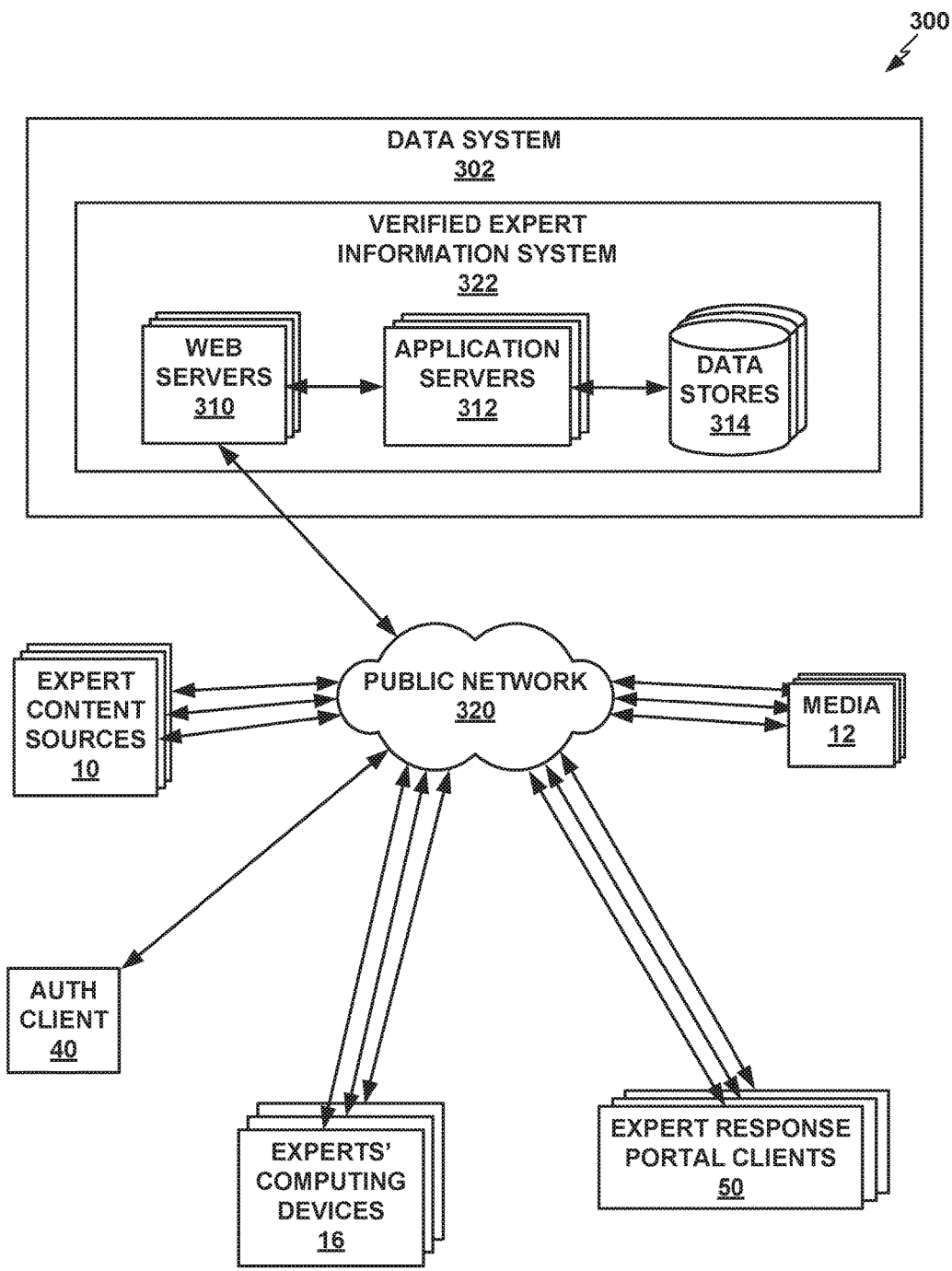
FIG. 3 depicts a conceptual block diagram of an implementation of a verified expert information system in a network environment, in one aspect of this disclosure.

FIG. 3 depicts a conceptual block diagram of an implementation of a verified expert information system 322 in a network environment 300, in one aspect of this disclosure. Verified expert information system 322 is hosted in a data system 302, which may include one or more servers at one or more data centers or other locations. Verified expert information system 322 may include one or more web servers 310, one or more application servers 312, and one or more databases or other data stores 314. Some or all of the modules of verified expert information systems 22, 222 as described above may be executed by one or more application servers 312, operably configured to store data to and retrieve data from data stores 314, and to share external interfaces and retrieve external data via web servers 310. For example, verified expert information system 322 may implement tagged topic verified expert data store 33 as depicted in FIG. 2 among data stores 314. Verified expert information system 322 may also implement one or more of external web interfaces of expert content source registrar 24, topic of interest detecting module 26, topic tagging module 30, tagged topic expert verifier and indexer module 32, authorization client 40, expert response interface 36, and/or expert response portal 38 among web servers 310.

Web servers 310 interact with external resources via a public network 320, such as the Internet. Public network 320 enables network communication among web servers 310 of verified expert information system 322, expert content sources 10, authorization client 40 (in examples in which authorization client 40 is external to verified expert information system 322), experts' computing devices 16, expert response portal clients 50 (e.g., implemented by any types of computing devices of general public users to access outputs by verified expert information system 322), and media 12 (e.g., social media, online news media).

Figure 4:
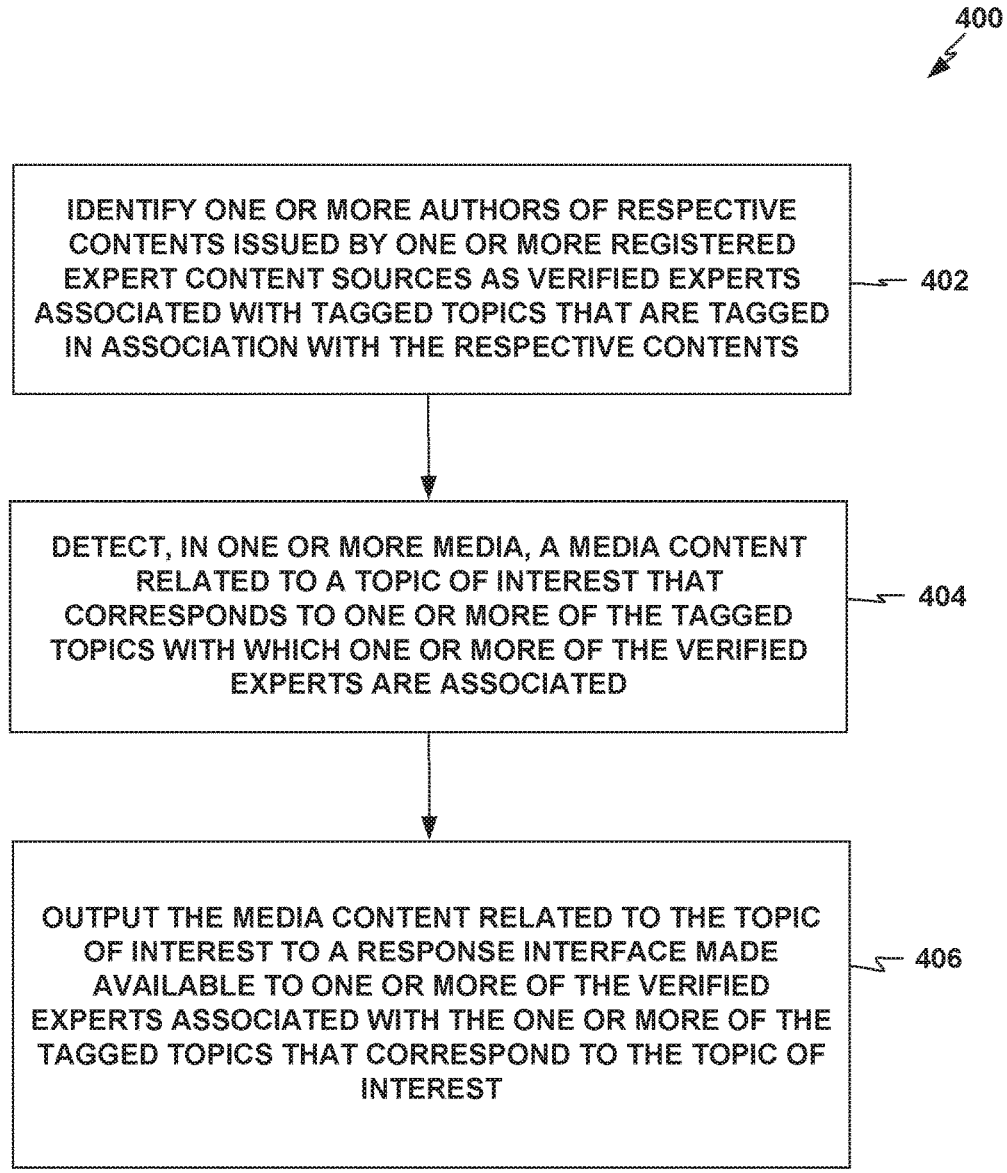
FIG. 4 depicts a flowchart of an example process that verified expert information system, executing on one or more computing devices (e.g., servers, computers, processors, etc.), may perform, in one aspect of this disclosure.

FIG. 4 depicts a flowchart of an example process 400 that verified expert information system 22, 222, or 322, executing on one or more computing devices (e.g., servers, computers, processors, etc.), may perform, in one aspect of this disclosure. Verified expert information system 22, 222, 322 performing process 400 may identify one or more authors of respective contents (e.g., scholarly research articles) issued by one or more registered expert content sources 10 (e.g., peer-reviewed research publications, highly regarded universities, elite institutions) as verified experts associated with tagged topics that are tagged in association with the respective contents (402). Verified expert information system 22, 222, 322 performing process 400 may further detect, in one or more media 12 (e.g., social media, online news media, blogs), a media content (e.g., a social media post, an article, a blog post) related to a topic of interest that corresponds to one or more of the tagged topics with which one or more of the verified experts are associated (404). Verified expert information system 22, 222, 322 performing process 400 may further output the media content related to the topic of interest to a response interface 36 made available to one or more of the verified experts associated with the one or more of the tagged topics that correspond to the topic of interest (406). Various implementations of process 400 may also include additional features, potentially including any of the processes described above.

Figure 5:
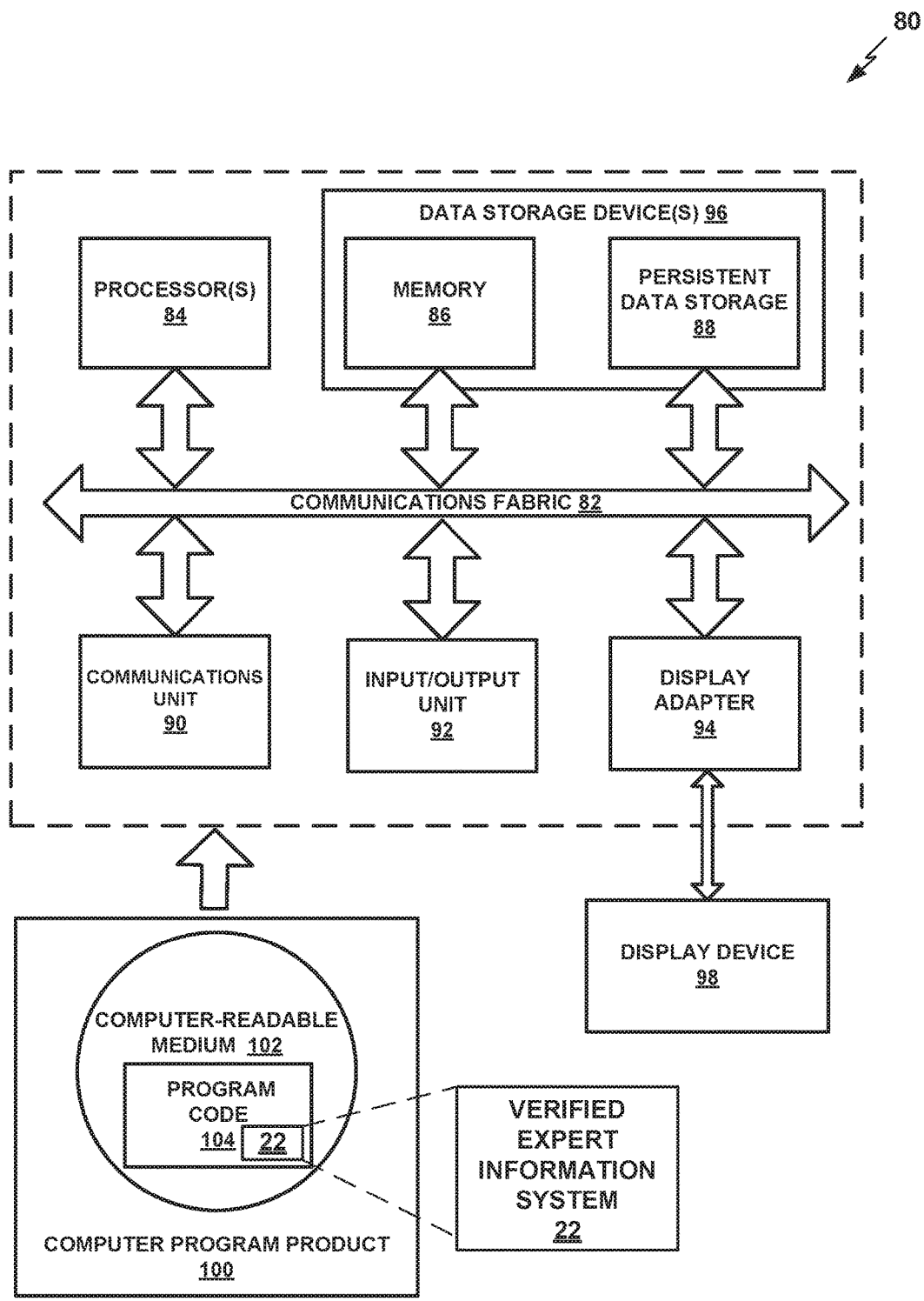
FIG. 5 is a block diagram of a computing device that may be used to execute a verified expert information system, and that may implement or embody any other techniques or features described herein, in various aspects of this disclosure.

FIG. 5 is a block diagram of a computing device 80 that may be used to execute a verified expert information system 22, 222, or 322 (depicted in FIG. 5 as verified expert information system 22), and that may implement or embody any other techniques or features described herein, in various aspects of this disclosure. Computing device 80 may potentially implement verified expert information system 22, 222, 322 as a standalone application, and/or as a plug-in or add-on to another system, in various examples. Computing device 80 may be a server, laptop computer, desktop computer, or any other type of computing device or component of a data system, such as one of application servers 312 as depicted in FIG. 3. Computing device 80 may also be a virtual server in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, game console, smart television, smart automobile, or other programmable data processing apparatus of any kind. Other implementations of a computing device 80 may include a computer or device having capabilities or formats other than or beyond those described herein.

In the illustrative example of FIG. 5, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a verified expert information system 22, as described in greater detail above. This program code may be stored on memory 86, persistent data storage 88, or elsewhere in computing device 80. This program code may also take the form of program code 104 stored on computer-readable medium 102 included in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over mediums, such as communications links or wireless transmissions containing the program code 104. Program code 104 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical detail level of integration. The computer program product may include a computer readable storage medium (or mediums) having computer readable program instructions thereon for causing a processor to carry out aspects of the present invention.

The computer readable storage medium may be a device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission mediums (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    identifying, by a computing system comprising one or more processors, one or more authors of respective contents issued by one or more registered expert content sources as verified experts associated with tagged topics that are tagged in association with the respective contents;
    detecting, by the computing system in one or more media, a media content related to a topic of interest that corresponds to one or more of the tagged topics with which one or more of the verified experts are associated;
    outputting the media content related to the topic of interest to a response interface made available to at least one computing device of one or more of the verified experts associated with the one or more of the tagged topics that correspond to the topic of interest;
    receiving, by the computing system and from the at least one computing device of the one or more of the verified experts associated with the one or more of the tagged topics, one or more responses to the media content related to the topic of interest entered to the response interface; and
    after enabling a topic search function, and in response to receiving a user query input that corresponds to the media content or the topic of interest, outputting, by the computing system, the one or more responses from the at least one of the verified experts via an expert response portal.

2. The method of claim 1, further comprising:
    indexing the verified experts in respective association with the tagged topics; and
    selecting, from among the verified experts, one or more of the verified experts indexed in association with one or more of the tagged topics that correspond to the topic of interest.

3. The method of claim 1, further comprising:
    parsing the contents issued by the one or more registered expert content sources, thereby tagging the parsed contents by topic, wherein the tagged topics of the respective content refer to the tagging of the parsed contents by topic; and
    identifying authors of the parsed contents issued by the one or more registered expert content sources, thereby generating identifications of the verified experts associated with the tagged topics of the respective parsed contents.

4. The method of claim 1, further comprising:
    registering the one or more expert content sources, prior to identifying the one or more authors of the respective contents issued by the one or more registered expert content sources as the verified experts.

5. The method of claim 4, further comprising:
    registering the expert content sources in association with respective topic tags; and
    associating the respective topic tags with the respective contents by the verified experts only for topic tags associated with the one or more expert content sources that have issued contents authored by the respective verified experts.

6. The method of claim 1, further comprising detecting the topic of interest in the one or more media, prior to identifying the one or more of the tagged topics that correspond to the topic of interest.

7. The method of claim 1, further comprising outputting one or more of the responses from the one or more verified experts on each of a plurality of topics of interest in an organized format in which the topics of interest are ranked based at least in part on at least one of: recency of popular interest, popularity of interest, geographical location, or individualized user data indicative of user interest of a user of the expert response portal.

8. The method of claim 1, further comprising:
    providing a verified expert badge that adheres to the responses from the verified experts in online postings, wherein the verified expert badge is selectably verifiable.

9. The method of claim 1, further comprising:
    parsing contents from one or more social media; and
    identifying the topic of interest in the one or more social media based at least in part on detecting that a topic has increased in frequency in the parsed contents in the one or more social media.

10. The method of claim 1, wherein identifying the one or more authors of respective contents issued by the one or more registered expert content sources as verified experts associated with tagged topics that are tagged in association with the respective contents comprises:
- receiving user login information from an expert candidate; and
- using a secure authorization technology to check the user login information with a particular expert content source from among the one or more expert content sources to access verification of the expert candidate from the particular expert content source.

11. The method of claim 1, wherein identifying the one or more authors of respective contents issued by the one or more registered expert content sources as verified experts associated with tagged topics that are tagged in association with the respective contents comprises:
- registering an online identifier of an expert candidate as used online by one of the expert content sources.

12. The method of claim 1, further comprising registering a ranking of expertise of one or more of the experts depending on at least one of quantity and quality of forms of verification of a verified expert's expertise by the expert content sources.

13. A computer program product comprising a computer-readable storage medium having program code embodied therewith, the program code executable by a computing system to:
- identify one or more authors of respective contents issued by one or more registered expert content sources as verified experts associated with tagged topics that are tagged in association with the respective contents;
- detect, in one or more media, a media content related to a topic of interest that corresponds to one or more of the tagged topics with which one or more of the verified experts are associated;
- output the media content related to the topic of interest to a response interface made available to at least one computing device of one or more of the verified experts associated with the one or more of the tagged topics that correspond to the topic of interest;
- receive, from the at least one computing device of the one or more of the verified experts associated with the one or more of the tagged topics, one or more responses to the media content related to the topic of interest entered to the response interface; and
- after enabling a topic search function, and in response to receiving a user query input that corresponds to the media content or the topic of interest, output the one or more responses from the at least one of the verified experts via an expert response portal.

14. The computer program product of claim 13, further comprising program code executable to:
- parse the contents issued by the one or more registered expert content sources, thereby tagging the parsed contents by topic, wherein the tagged topics of the respective content refer to the tagging of the parsed contents by topic; and
- identify authors of the parsed contents issued by the one or more registered expert content sources, thereby generating identifications of the verified experts associated with the tagged topics of the respective parsed contents.

15. A computer system comprising:
- one or more processors, one or more computer-readable memories, and one or more computer-readable storage mediums;
- program instructions, stored on at least one of the one or more storage devices for execution by at least one of the one or more processors via at least one of the one or more memories, to identify one or more authors of respective contents issued by one or more registered expert content sources as verified experts associated with tagged topics that are tagged in association with the respective contents;
- program instructions, stored on at least one of the one or more storage devices for execution by at least one of the one or more processors via at least one of the one or more memories, to detect, in one or more media, a media content related to a topic of interest that corresponds to one or more of the tagged topics with which one or more of the verified experts are associated;
- program instructions, stored on at least one of the one or more storage devices for execution by at least one of the one or more processors via at least one of the one or more memories, to output the media content related to the topic of interest to a response interface made available to at least one computing device of one or more of the verified experts associated with the one or more of the tagged topics that correspond to the topic of interest;
- program instructions, stored on at least one of the one or more storage devices for execution by at least one of the one or more processors via at least one of the one or more memories, to receive, from the at least one computing device of the one or more of the verified experts associated with the one or more of the tagged topics that correspond to the topic of interest, one or more responses to the media content related to the topic of interest entered to the response interface; and
- program instructions, stored on at least one of the one or more storage devices for execution by at least one of the one or more processors via at least one of the one or more memories, to enable a topic search function that, in response to a user query input corresponding to the media content or the topic of interest, outputs the one or more responses from the at least one of the verified experts via an expert response portal.

16. The computer system of claim 15, further comprising:
- program instructions, stored on at least one of the one or more storage devices for execution by at least one of the one or more processors via at least one of the one or more memories, to parse the contents issued by the one or more registered expert content sources, thereby tagging the parsed contents by topic, wherein the tagged topics of the respective content refer to the tagging of the parsed contents by topic; and
- program instructions, stored on at least one of the one or more storage devices for execution by at least one of the one or more processors via at least one of the one or more memories, to identify authors of the parsed contents issued by the one or more registered expert content sources, thereby generating identifications of the verified experts associated with the tagged topics of the respective parsed contents.

\* \* \* \* \*